(12) United States Patent
Nakamura et al.

(10) Patent No.: US 11,833,977 B2
(45) Date of Patent: Dec. 5, 2023

(54) DISPLAY DEVICE THAT CAN BE MOUNTED ON VEHICLE

(71) Applicant: PANASONIC INTELLECTUAL PROPERTY MANAGEMENT CO., LTD., Osaka (JP)

(72) Inventors: Shinya Nakamura, Kanagawa (JP); Takuya Ueda, Kanagawa (JP); Yukihiro Araki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/699,857

(22) Filed: Mar. 21, 2022

(65) Prior Publication Data

US 2022/0306013 A1    Sep. 29, 2022

(30) Foreign Application Priority Data

Mar. 26, 2021   (JP) .................................. 2021-052948

(51) Int. Cl.
*B60R 11/02* (2006.01)
*B60K 35/00* (2006.01)
*B60R 11/00* (2006.01)

(52) U.S. Cl.
CPC .......... *B60R 11/0235* (2013.01); *B60K 35/00* (2013.01); *B60R 2011/0005* (2013.01)

(58) Field of Classification Search
CPC ........ B60K 2370/688; B60K 2370/691; B60K 2370/816; B60K 2370/81; B60K 2370/84; B60K 2370/87; B60K 35/00; B60K 37/04; B60K 31/00; B60K 37/00; B60K 37/02; B60K 2370/1438; G02F 1/133308; G02F 1/133314; G02F 1/133317; G02F 1/13332; G02F 1/133322; G02F 1/13338; G02F 2201/54; B60R 11/0235; B60R 2011/0005; B60R 2011/0003; B60R 11/0223; B60R 2011/0043; B60R 2011/0049; B60R 2011/005; B60R 2011/0052

USPC ................................................. 348/148, 837
See application file for complete search history.

(56) References Cited

U.S. PATENT DOCUMENTS

| | | | |
|---|---|---|---|
| 9,985,314 B2 | 5/2018 | Ose et al. | |
| 2002/0063812 A1* | 5/2002 | Natsuyama | G02F 1/133308 349/58 |
| 2014/0104504 A1* | 4/2014 | Kuwajima | H05K 5/02 348/843 |
| 2015/0349378 A1 | 12/2015 | Ose et al. | |
| 2019/0212605 A1* | 7/2019 | Shimojo | G02F 1/133308 |

FOREIGN PATENT DOCUMENTS

| | | |
|---|---|---|
| JP | 2014-137869 | 7/2014 |
| JP | 2016-013814 | 1/2016 |

* cited by examiner

*Primary Examiner* — Nathnael Aynalem
(74) *Attorney, Agent, or Firm* — Greenblum & Bernstein, P.L.C.

(57) ABSTRACT

A plate has a first region and a second region. A display unit is provided on a front surface of the plate and mounted in the first region of the plate. A housing provided on a rear surface of the plate and mounted in the second region of the plate, wherein the housing is also adapted to be mounted on a vehicle, and a rigidity of the first region of the plate is higher than a rigidity of the second region of the plate.

9 Claims, 5 Drawing Sheets

DISPLAY DEVICE THAT CAN BE MOUNTED ON VEHICLE

BACKGROUND

1. Field

The present disclosure relates to a display device that can be mounted on a vehicle.

2. Description of the Related Art

In a display device for displaying vehicle information, the mount on the housing side is secured to the anchor part on the vehicle side by screws such that the surfaces thereof are in contact with each other. This therefore creates distortion or warp of the housing when the housing is secured or when the vehicle is vibrated, and the distortion or warp deforms the display unit. In order to prevent viewability of display from being impaired due to the deformation, the display unit is mounted by using an elastically deformable washer (see, for example, patent literature 1).

[Patent Literature 1] JP 2016-13814

Securing the display unit by using an elastically deformable washer inhibits distortion on the vehicle side and makes it difficult for the distortion to be transferred to the display unit. When the performance of the display device in terms of distortion resistance is poor, or when the distortion on the vehicle side is large, however, the distortion might not be absorbed completely and it might be transferred to the display unit.

SUMMARY

The present disclosure addresses the above-described issue, and a purpose thereof is to provide technology of reducing the impact of vehicle side distortion on the display unit mounted on the vehicle.

A display device according to an embodiment of the present disclosure includes: a plate having a first region and a second region; a display unit provided on a front surface of the plate and mounted in the first region of the plate; and a housing provided on a rear surface of the plate and mounted in the second region of the plate. The housing is also adapted to be mounted on a vehicle, and a rigidity of the first region is higher than a rigidity of the second region.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION

The invention will now be described by reference to the preferred embodiments. This does not intend to limit the scope of the present invention, but to exemplify the invention.

A brief summary will be given before describing the present disclosure in specific details. An embodiment relates to a display device that can be mounted on a vehicle. The display device is mounted in the dashboard of the vehicle and displays an image of a speedometer for presenting a traveling speed, an image of a tachometer for presenting the number of revolutions of the engine per minute (hereinafter, may be generically referred to as "meter images"), etc. The display device is configured such that a display unit capable of displaying meter images is mounted in a housing, and the housing is secured to the vehicle at three or four mounts. In that process, the housing is distorted by the mounts when the display device is secured because the parts of the vehicle in which the mounts are fixed are not necessarily flat. When the distortion is transferred to the display unit, unevenness in the brightness on the display unit occurs, and the display quality becomes poorer.

In related-art display devices, the metallic plate that supports the display unit from behind is provided with a slit between the mount for mounting on the housing and the mount of the display unit. Therefore, the distortion on the housing side is inhibited by the slit, which makes it difficult for the distortion to be transferred to the display unit. When the performance in terms of distortion resistance is poor depending on the type of liquid crystal, etc. or when the distortion of the mount for mounting on the vehicle is large, however, the distortion might not be absorbed completely and it might be transferred to the display unit.

The present disclosure is addressed by this embodiment by configuring the rigidity of the first region of the plate in which the display unit is mounted to be higher than the rigidity of the second region of the plate in which the housing is mounted, thereby providing the second region with a distortion absorption structure. Further, the housing is also provided with a distortion absorption structure by providing a slit in the mount in the housing for mounting on the vehicle. Since the distortion on the vehicle side is inhibited by two distortion absorption structures, it is more difficult for the distortion to be transferred to the display unit. The terms "parallel" and "orthogonal" in the following description not only encompass completely parallel or orthogonal but also encompass slightly off-parallel and slightly non-orthogonal within the margin of error. The term "substantially" means identical within certain limits.

Figure 1:
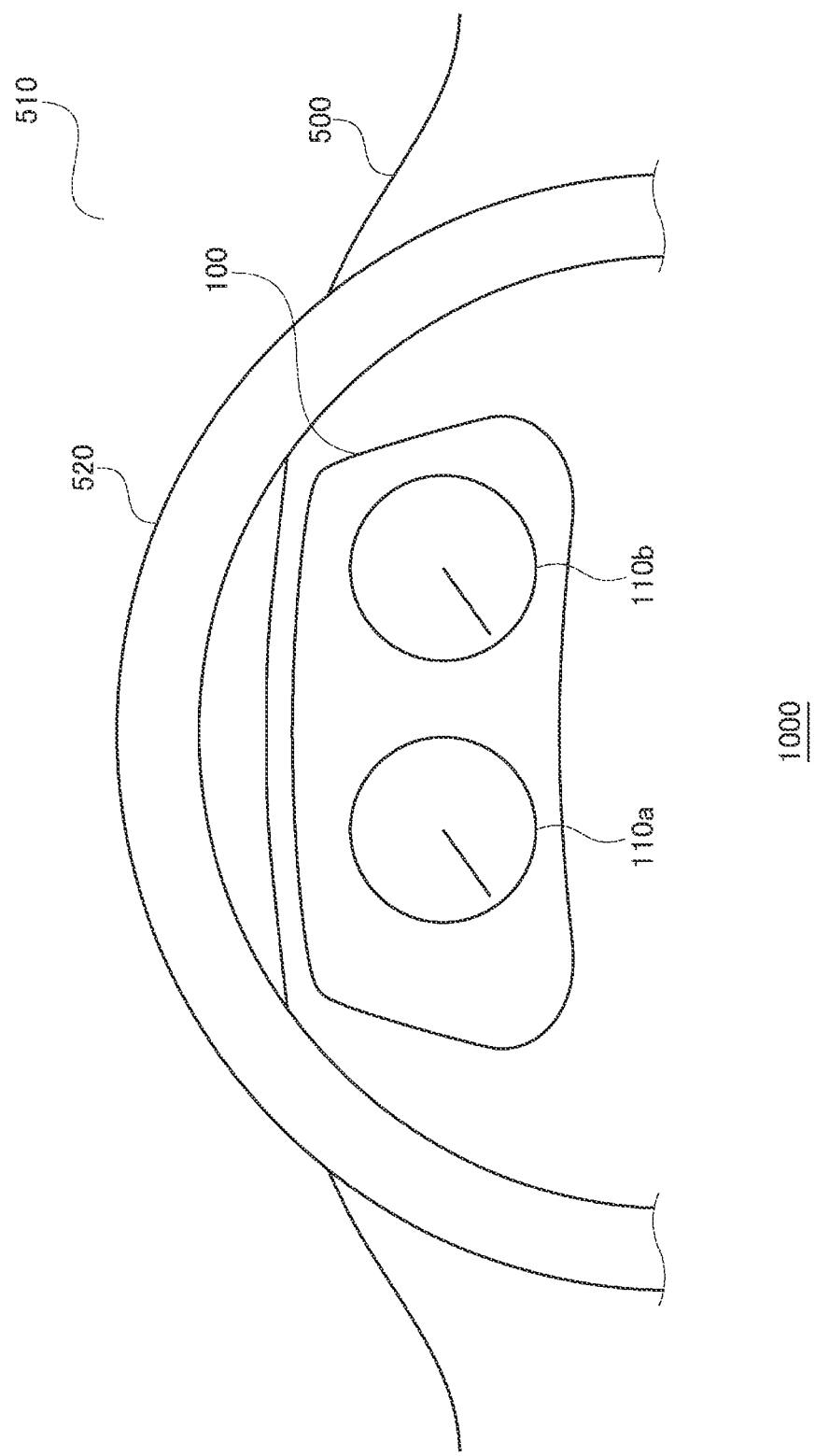
FIG. 1 shows a structure of the vehicle interior of a vehicle according to an embodiment.

FIG. 1 shows a structure of the vehicle interior of a vehicle 1000. The figure shows a view in front of the driver's seat. A display device 100 is fixed in a dashboard 500. A first meter image 110a and a second meter image 110b, which are generically referred to as meter images 110, are displayed on the display device 100. The first meter image 110a is, for example, an image of a speedometer, and the second meter image 110b is, for example, an image of a tachometer. A front window 510 is provided above the dashboard 500, and a steering wheel 520 is provided closer to the driver than the dashboard 500. Accordingly, the driver (not shown) manipulating the steering wheel 520 can view the meter images 110 displayed on the display device 100 while, at the same time, seeing the scene in front through the front window 510.

Figure 2:
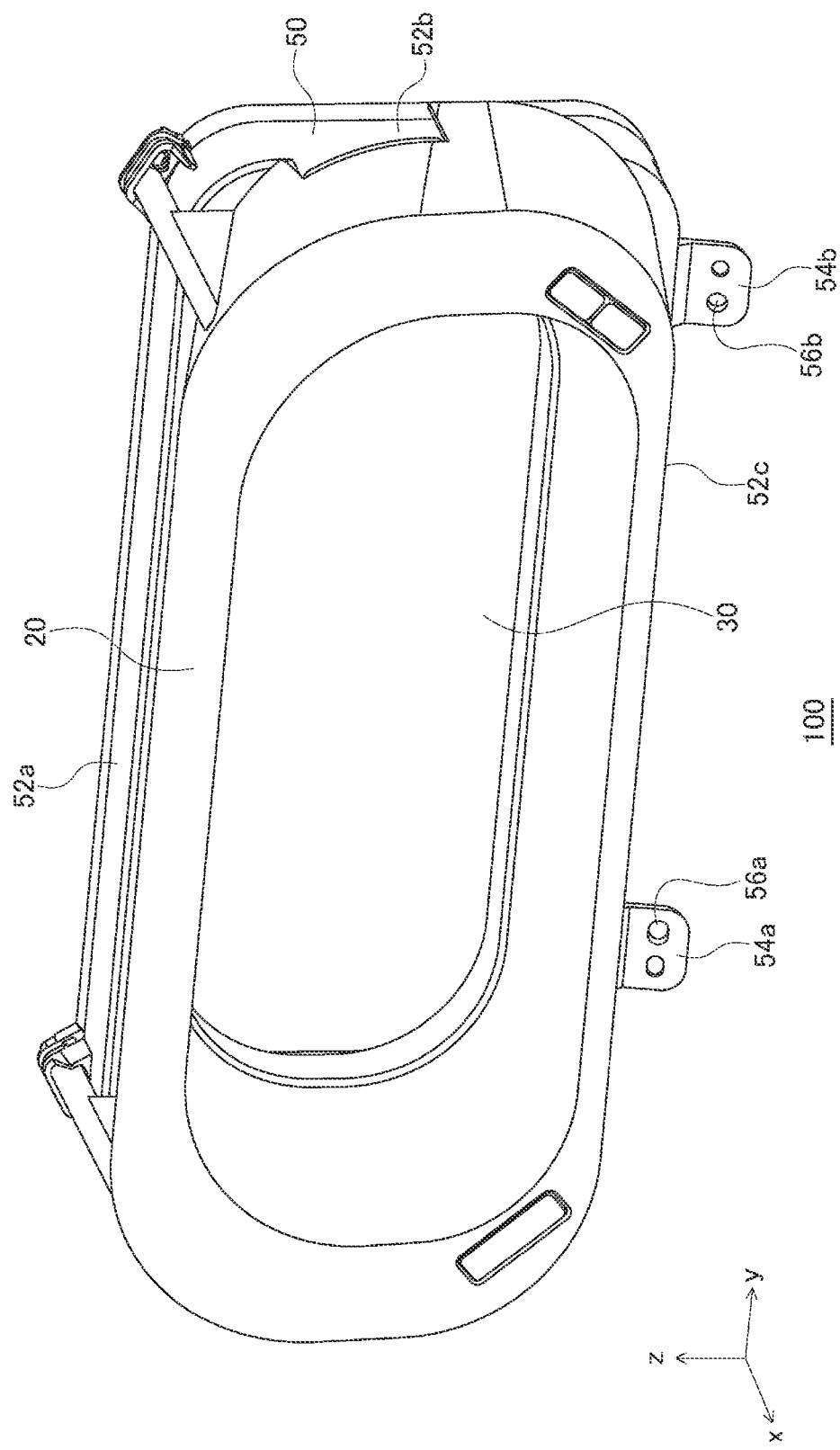
FIG. 2 is a perspective view showing a structure of the display device of FIG. 1.

FIG. 2 is a perspective view showing a structure of the display device 100. As shown in FIG. 2, an orthogonal coordinate system including an x axis, a y axis, and a z axis is defined. The z axis extends in the vertical direction of the display device 100. The positive directions of the x axis, y axis, and z axis are defined in the directions of arrows in FIG. 2, and the negative directions are defined in the directions opposite to those of the arrows. The positive direction of the x axis may be referred to as "front", "frontward", "front side", the negative direction of the x axis may be referred to as "rear", "rearward", "rear side", the positive direction of the y axis may be referred to as "right", "rightward", the negative direction of the y axis may be referred to as "left", "leftward", the positive direction of the z axis may be referred to as "above", "upper side", and the negative direction of the z axis may be referred to as "below", "lower side". It can therefore be said that the x axis extends in the longitudinal direction, the y axis extends in the lateral direction, and the z axis extends in the vertical direction.

A front housing 20 is made of, for example, a resin and has an opening that extends through in the longitudinal direction. A display unit 30 is provided behind the opening of the front housing 20. Further, a rear housing 50 is provided behind the front housing 20 and the display unit 30. By coupling the front housing 20 and the rear housing 50 in the longitudinal direction, the display unit 30 is provided inside. On the y-z plane, the outer circumference of the rear housing 50 is bounded by a first outer edge part 52a, a second outer edge part 52b, a third outer edge part 52c, and a fourth outer edge part 52d (not shown), which are generically referred to as outer edge parts 52. Of these, the third outer edge part 52c extends in the lateral direction on the lower side.

A first mounting arm 54a extending downward is provided in the left part of the third outer edge part 52c, and a second mounting arm 54b extending downward is provided in the right part of the third outer edge part 52c. The first mounting arm 54a and the second mounting arm 54b are generically referred to as mounting arms 54. By driving screws through a first mounting through hole 56a provided in the first mounting arm 54a and through a second mounting through hole 56b provided in the second mounting arm 54b, the mounting through holes 56 are secured to the vehicle 1000 by the screws. When the parts of the side of the vehicle 1000 in which the mounting through holes 56 are secured are not flat, the rear housing 50 may also be distorted as the mounting arms 54 are distorted when the mounting through holes 56 are secured.

Figure 3:
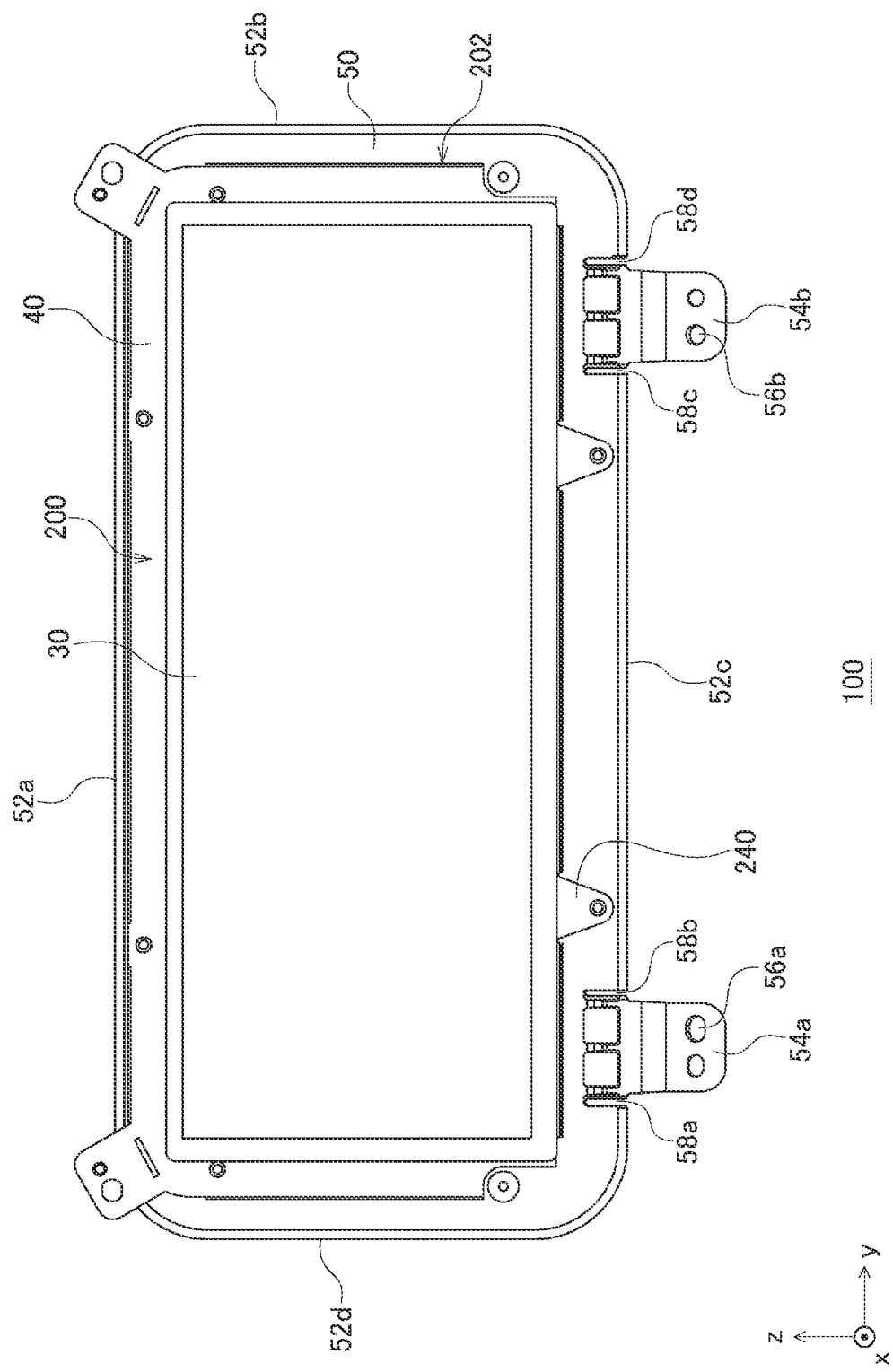
FIG. 3 shows an internal structure of the display device of FIG. 1.
Figure 4:
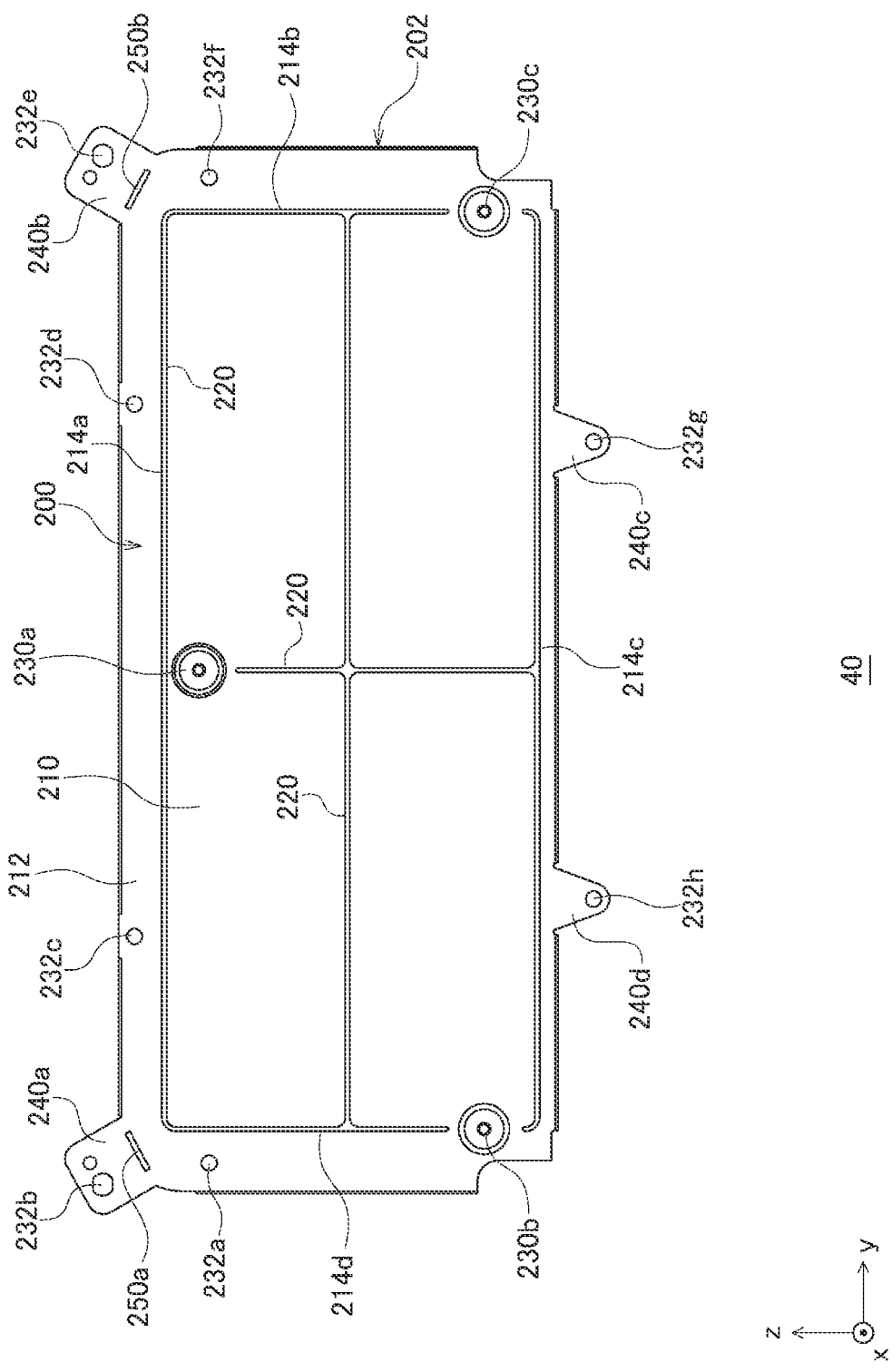
FIG. 4 shows a structure of a plate of FIG. 3.

FIG. 3 shows an internal structure of the display device 100, and FIG. 4 shows a structure of a plate 40. These figures show front views revealed when the front housing 20 is removed from the display device 100 of FIG. 1. The display device 100 includes the display unit 30, the plate 40, and the rear housing 50.

The plate 40 has a plate shape and has a rectangular surface on the y-z plane. The frontward surface of the plate 40 is a first surface 200, and a rearward surface of the plate 40 is a second surface 202. When the first surface 200 is called the front surface, the second surface 202 will be called the rear surface. The display unit 30 is provided on the side of the first surface 200 of the plate 40, and the rear housing 50 is provided on the side of the second surface 202 of the plate 40.

A rectangular first region 210 is provided in the center of the plate 40, and a frame-shaped second region 212 is provided outside the first region 210 of the plate 40. The first region 210 and the second region 212 are partitioned by a first boundary 214a through a fourth boundary 214d, which are generically referred to as boundaries 214. The first boundary 214a extends in the lateral direction, the second boundary 214b extends downward from the right end of the first boundary 214a, the third boundary 214c extends leftward from the lower end of the second boundary 214b, and the fourth boundary 214d connects the left end of the third boundary 214c and the left end of the first boundary 214a.

The plate 40 is a metallic plate, and a draw-bead 220 is provided in the first region 210 by processing the first region 210 to produce a draw-bead. Meanwhile, the second region 212 is not processed to produce a draw-bead so that the draw-bead 220 is not provided in the second region 212. Therefore, the rigidity of the first region 210 is higher than the rigidity of the second region 212.

A first inner through hole 230a through a third inner through hole 230c, which are generically referred to as inner through holes 230, are provided in the first region 210. By driving screws through the inner through holes 230, the display unit 30 is secured to the plate 40 by the screws. In other words, the display unit 30 is mounted in the first region 210 of the plate 40. The number of the inner through holes 230 is not limited to "3".

A first mounting projection 240a projecting outward is provided in the upper and left part of the second region 212, and a second mounting projection 240b projecting outward is provided in the upper and right part of the second region 212. A first slit 250a is provided at the root of the first mounting projection 240a, and a second slit 250b is provided at the root of the second mounting projection 240b. The first slit 250a and the second slit 250b are generically referred to as slits 250. The slits 250 have a shape of a straight line and extend through the plate 40 in the longitudinal direction.

Also, a third mounting projection 240c projecting outward is provided in the lower and right part of the second region 212, and a fourth mounting projection 240d projecting outward is provided in the lower and left part of the second region 212. The first mounting projection 240a through the fourth mounting projection 240d are generically referred to as mounting projections 240. The mounting projections 240 are also included in the second region 212. A first outer through hole 232a through an eighth outer through hole 232h, which generically referred to as outer through holes 232, are provided in the second region 212. By driving screws through the outer through holes 232, the rear housing 50 is secured to the plate 40 by the screws. In other words, the rear housing 50 is mounted in the second region 212 of the plate 40. The number of outer through holes 232 is not limited to "8". At least one of the outer through holes 232 may be provided in at least one of the mounting projections 240.

The rear housing 50 is made of, for example, a resin. As described above, the outer circumference of the rear housing 50 is bounded, on the y-z plane, by the first outer edge part 52a, the second outer edge part 52b, the third outer edge part 52c, and the fourth outer edge part 52d. The first outer edge part 52a extends laterally in the upper part of the rear housing 50, and the second outer edge part 52b extends downward from the right end of the first outer edge part 52a. Further, the third outer edge part 52c extends leftward from the lower end of the second outer edge part 52b, and the fourth outer edge part 52d connects the left end of the third outer edge part 52c and the left end of the first outer edge part 52a.

The first mounting arm 54a and the second mounting arm 54b projecting outward are provided in the third outer edge part 52c. As described above, the rear housing 50, i.e., the display device 100, is also mounted on the vehicle 1000 by securing the first mounting through hole 56a provided in the first mounting arm 54a and the second mounting through hole 56b provided in the second mounting arm 54b by screws.

Figure 5:
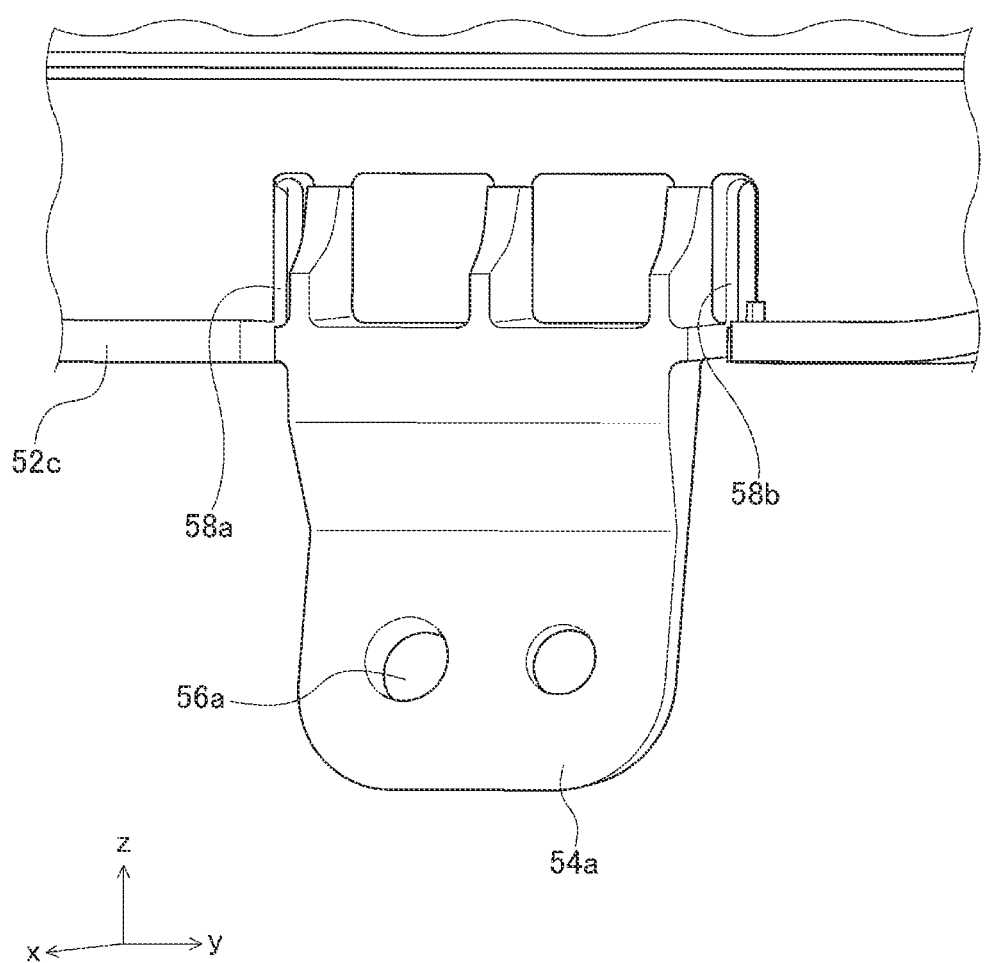
FIG. 5 is a perspective view showing a structure of the first mounting arm of FIG. 3.

FIG. 5 is a perspective view showing a structure of the first mounting arm 54a. A first slit 58a is provided at the left root of the first mounting arm 54a, and a second slit 58b is provided at the right root of the first mounting arm 54a. The first slit 58a and the second slit 58b are generically referred to as slits 58. The slits 58 have a shape extending upward from the third outer edge part 52c and extends through the rear housing 50 in the longitudinal direction. Reference is made back to FIG. 3. As in the first mounting arm 54a, a third slit 58c and a fourth slit 58d are provided in the second mounting arm 54b. The third slit 58c and the fourth slit 58d are also generically referred to as the slits 58.

When the parts on the side of the vehicle 1000 in which the mounting arms 54 are fixed are not flat, the mounting arms 54 are distorted when they are fixed. Since the slits 58 are provided at the roots of the mounting arms 54, the rigidity of the mounting arms 54 is reduced, which makes it difficult for the distortion of the mounting arms 54 to be transferred to the rear housing 50. Consequently, the distortion of the rear housing 50 due to the distortion of the mounting arms 54 is reduced. Since the rear housing 50 is mounted in the second region 212 of the plate 40, any distortion of the rear housing 50 is transferred to the plate 40. The rigidity of the second region 212 is lower than the rigidity of the first region 210 in the plate 40 so that the distortion of the rear housing 50 is easily absorbed in the second region 212. It is therefore difficult for the distortion of the second region 212 due to the distortion of the rear housing 50 to be transferred to the first region 210. Further, the impact of distortion on the display unit 30 mounted in the first region 210 is reduced since the rigidity of the first region 210 is high. As a result, unevenness in the brightness of display on the display unit 30 is inhibited, and the display quality is maintained.

According to the embodiment, the rigidity of the first region of the plate in which the display unit is mounted is configured to be higher than the rigidity of the second region of the plate in which the housing is mounted. Accordingly, the distortion on the vehicle side is reduced in the second region when the display unit is mounted on the vehicle. Further, since the distortion on the vehicle side is reduced in the second region when the display unit is mounted on the vehicle, the impact of distortion on the rigid first region is reduced. Further, since the impact of distortion on the rigid first region is reduced, the impact on the display unit is reduced. Further, since the first region is processed to produce a draw-bead, the rigidity of the first region is increased. Further, since a slit is provided at the root of the mounting arm of the housing, the rigidity of the mounting arm can be decreased. Further, since the rigidity of the mounting arm is reduced, the impact of distortion of the vehicle is reduced.

A summary of an embodiment of the present disclosure is given below. A display device according to an embodiment of the present disclosure includes: a plate having a first region and a second region; a display unit provided on a front surface of the plate and mounted in the first region of the plate; and a housing provided on a rear surface of the plate and mounted in the second region of the plate. The housing is also adapted to be mounted on a vehicle, and a rigidity of the first region is higher than a rigidity of the second region.

According to the embodiment, the rigidity of the first region of the plate in which the display unit is mounted is configured to be higher than the rigidity of the second region of the plate in which the housing is mounted. Accordingly, the impact of vehicle side distortion on the display unit is reduced when the display unit is mounted on the vehicle.

The first region may be processed to produce a draw-bead. In this case, the first region is processed to produce a draw-bead so that the rigidity of the first region is increased.

The first region of the plate is provided in the center, and the second region is provided outside the first region. An outer edge of the housing may be provided with a mounting arm that projects outward and is adapted to be mounted on the vehicle, and a slit may be provided at a root of the mounting arm. In this case, the slit is provided at the root of the mounting arm of the housing so that the elasticity of the mounting arm reduces the impact of vehicle distortion.

Given above is a description of the present disclosure based on an exemplary embodiment. The embodiment is intended to be illustrative only and it will be understood by those skilled in the art that various modifications to constituting elements and processes could be developed and that such modifications are also within the scope of the present disclosure.

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is based upon and claims the benefit of priority from the prior Japanese Patent Application No. 2021-052948, filed on Mar. 26, 2021, the entire contents of which are incorporated herein by reference.

What is claimed is:

1. A display device comprising:
   a plate having a first region and a second region, the second region surrounding the first region, the first region and the second region being on a same plane;
   a display provided on a front surface of the plate and mounted in the first region of the plate; and
   a housing provided on a rear surface of the plate and mounted in the second region of the plate, wherein
   the housing is adapted to be mounted on a vehicle,
   a rigidity of the first region is higher than a rigidity of the second region, and
   an entire part of the first region and an entire part of the second region are in the plate.
2. The display device according to claim 1, wherein the plate is a metallic plate.
3. The display device according to claim 2, wherein the housing is made of a resin.
4. The display device according to claim 1, wherein the first region is processed to produce a draw-bead.
5. The display device according to claim 4, wherein the second region is not processed to produce a draw-bead.
6. The display device according to claim 1, wherein
   the first region is provided in the center of the plate,
   the second region is provided outside the first region of the plate,
   an outer edge of the housing is provided with a mounting arm that projects outward and is adapted to be mounted on the vehicle, and
   a slit is provided at a root of the mounting arm.
7. The display device according to claim 6, wherein
   an inner through hole is provided in the first region, and the display is secured to the plate by a screw by driving the screw through the inner through hole.

8. The display device according to claim 7, wherein
one or more outer through holes are provided in the second region, and
the housing is secured to the plate by one or more screws by driving the one or more screws through the one or more outer through holes.

9. The display device according to claim 8, wherein
a mounting projection that projects outward is provided in the second region, and
the one or more outer through holes include an outer through hole provided in the mounting projection.

\* \* \* \* \*